United States Patent [19]
Voloshin

[11] Patent Number: 6,134,240
[45] Date of Patent: Oct. 17, 2000

[54] CHIP ADDRESS ALLOCATION THROUGH A SERIAL DATA RING ON A STACKABLE REPEATER

[76] Inventor: Moshe Voloshin, 1575 Tanaka Pl., Apt. N5, Sunnyvale, Calif. 94087

[21] Appl. No.: 08/965,323

[22] Filed: Nov. 6, 1997

Related U.S. Application Data

[60] Provisional application No. 60/058,611, Sep. 10, 1997, and provisional application No. 60/062,391, Oct. 7, 1997.

[51] Int. Cl.[7] .......................... H04L 12/403; H04L 12/42
[52] U.S. Cl. ......................... 370/453; 370/258; 370/475
[58] Field of Search .................................. 370/453, 475, 370/450, 451, 258, 452, 438, 439, 457, 489, 445; 340/825.5, 825.52; 709/245, 238

[56] References Cited

U.S. PATENT DOCUMENTS

| | | | |
|---|---|---|---|
| 5,265,123 | 11/1993 | Vijeh et al. | 375/3 |
| 5,581,559 | 12/1996 | Crayford et al. | 370/392 |
| 5,638,522 | 6/1997 | Dunsmuir et al. | 395/326 |
| 5,640,393 | 6/1997 | Lo et al. | 370/392 |
| 5,689,726 | 11/1997 | Lin | 395/830 |
| 5,818,821 | 10/1998 | Schurig | 370/293 |
| 5,961,619 | 10/1999 | Voloshin | 710/101 |

OTHER PUBLICATIONS

Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7–14 (1995).

International Standard ISO/IEC 8802–3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125–155.

*Primary Examiner*—Douglas W. Olms
*Assistant Examiner*—David R Vincent

[57] ABSTRACT

Provided is a system which automatically determines and assigns an appropriate address for each chip in a repeater system. All the ASICs in a system are chained together on a serial data ring for address allocation purposes. A "First On" ASIC in a system initializes the chip address map, and assigns itself the first address. The First On ASIC then updates the address map by setting the next address and sends it down the chain to the next ASIC in the system. The second ASIC allocates the incoming address to itself, sets the address for the next ASIC, and passes the address signal on. The process repeats itself until the last ASIC in the chain has an address allocated. The last ASIC then notifies the First On ASIC of its address to close the loop.

11 Claims, 9 Drawing Sheets

CHIP ADDRESS ALLOCATION THROUGH A SERIAL DATA RING ON A STACKABLE REPEATER

CROSS REFERENCE TO RELATED APPLICATIONS

This application claims priority to co-pending U.S. Provisional Patent Applications Ser. No. 60/058,611, filed Sep. 10, 1997, and Ser. No. 60/062,391, filed Oct. 7, 1997, the disclosures of which are hereby incorporated by reference herein for all purposes.

This application is related to co-pending U.S. patent application Ser. Nos., 08/965,479, 08/965,330, 08/964,602, 08/964,601, 08/965,320, and 08/965,460, filed concurrently herewith, which are incorporated herein by reference for all purposes.

BACKGROUND OF THE INVENTION

The present invention relates generally to network computing. In particular the present invention relates to methods and apparatuses for allocating addresses to chips on repeater PCBs on a Fast Ethernet.

The growth of local-area networks (LANs) has been driven by the introduction of Ethernet technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabits per second (Mbps). Moreover, with more applications requiring faster LAN speeds for acceptable performance, network managers increasingly find that high-performance computation platforms and mission-critical applications can overwhelm a 10 Mbps network. Network managers therefore are increasingly are implementing high-speed LAN technology.

FAST ETHERNET

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the Fast Ethernet Alliance. The charter of the group was to draft the 802.3u 100BaseT specification of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: To maintain the Ethernet transmission protocol Carrier Sense Multiple Access Collision Detection (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

Other high-speed technologies, such as 100VG-AnyLAN and Asynchronous Transfer Mode (ATM), achieve data rates in excess of 100 Mbps by implementing different protocols that require translation when data moves to and from 10BaseT. Protocol translation requires changing the frame, which often causes delays in frame transmission through layer 2 (data-link layer) LAN switches. Data can move between Ethernet and Fast Ethernet, on the other hand, without requiring protocol translation or software changes, because Fast Ethernet maintains the 10BaseT error control functions as well as the frame format and length.

In many cases, organizations can upgrade to 100BaseT technology without replacing existing wiring. Options for 100BaseT media are the same as those for 10BaseT. They include shielded and unshielded twisted pair (STP and UTP) and fiber. The Media Independent Interface (MII) provides a single interface that can support external transceivers for any of the 100BaseT physical sublayers.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

Figure 1:
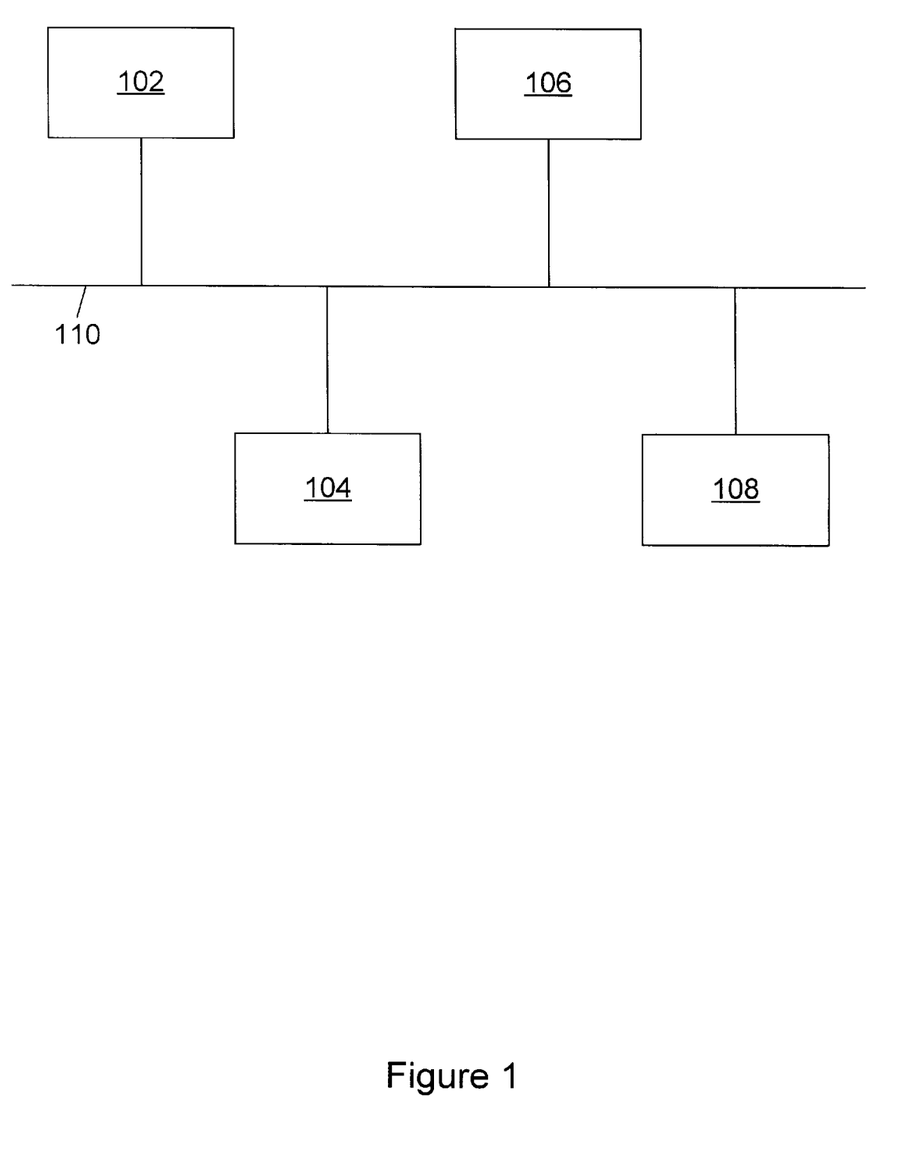
FIG. 1 depicts a carrier sense-collision detection local area network.

FIG. 1 depicts a carrier sense-collision detection LAN. Network devices 102, 104, 106, and 108 are attached to a network bus. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network device 102 or 104 could transmit its traffic even if network device 108 had already seized the channel after detecting that the channel was idle. This problem is called the collision window. The collision window is a factor of the propagation delay of the signal and the distance between two competing stations. Propagation delay is the delay that occurs before a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer.

Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, it order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet signal speed increases tenfold, from 10 Mbps to 100 Mbps. Therefore, the propagation delay for each part of the network, also referred to as the part's "latency," must be reduced if the 64 byte 802.3 specification collision detection standard is to be satisfied. Latency is typically expressed in terms of bit time, or the amount of data that could be transmitted on the network during the period which it takes a signal to propagate through a network device.

REPEATERS

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging-in network devices included in an Ethernet network, hence the term "hub." The Ethernet repeater receives messages from the network devices that are plugged into it and broadcasts (or "repeats") the message to all of the other devices on the network along a network bus, if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 ethernet network might broadcast complete frames of data before being notified of a collision. As described above, the broadcast of complete frames when a collision occurs would defeat a scheme for discarding data associated with collisions by simply discarding all partial frames.

Thus, minimizing the latency of a repeater is critical if the repeater is to be implemented on a network in accordance with the 802.3 specification. The 100BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

NETWORK FLEXIBILITY

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting size of the network and the latency of the two repeaters, it is ensured that collisions can be detected and devices connected to different repeaters can be notified of collisions in time to stop sending data before a complete frame is broadcast, in accordance with the 802.3 specification.

Because networks tend to constantly change and expand with network devices being added, it would be highly advantageous if, in addition to the Class II feature of allowing two repeaters in a collision domain, it were also possible that each of the two repeaters were expandable or stackable. Additional ports could be added to a first repeater stack that functions as one Class II repeater and then a second stack could be included as the second Class II repeater. Thus, stackability combined with cascadability would provide even greater flexibility for network expansion.

CHIP ADDRESS ALLOCATION

Network repeaters typically have several application specific integrated circuits (ASICs) on their PCB boards. The ASICs are responsible for carrying out the repeater function, that is, transmitting data from one chip to all of the others in a repeater or repeater stack. The ASICs also play a role in managing the flow of data to and from the repeater's ports and in collecting statistics of the performance of each of the ports. Each ASIC in a repeater will typically be associated with several of the repeater's I/O ports.

In any network repeater, it is important to designate addresses for the chips in the repeater so that the chips may be separately accessed to read or write data associated with a port or ports of interest. Conventionally, chip addresses have been allocated manually using microswitches. However, this process is cumbersome, particularly in a dynamic network environment where repeater units are regularly plugged (i.e., "hot insertion") and unplugged with power on, and therefore, addresses must be frequently reallocated. A faster and more convenient chip address allocation system would improve the operation of a stackable repeater network, for example, a Class II stackable repeater network, or any network where multiple ASICs exist in a single repeater domain.

Accordingly, there is a need for a chip address allocation system which provides efficient address allocation to each chip in a network. Moreover, it would be desirable if such a system was compatible with hot insertion, where new chips are added to a powered-on system and reallocation of chip addresses is required.

SUMMARY OF THE INVENTION

To achieve the foregoing, the present invention provides a system which automatically determines and assigns an appropriate address for each chip in repeater system. All the ASICs in a system are chained together on a serial data ring for address allocation purposes. A "First On" ASIC in a system initializes the chip address map, and assigns itself the first address. The First On ASIC then updates the address map by setting the next address and sends it down the chain to the next ASIC in the system. The second ASIC allocates the incoming address to itself, sets the address for the next ASIC, and passes the address signal on. The process repeats itself until the last ASIC in the chain has an address allocated. The last ASIC the notifies the First On ASIC of its address to close the loop.

In a preferred embodiment, the address allocation signal is 32 bits. The First On ASIC initializes the chip address map and allocates the initial address (0) to itself, saving it in its chip address register, and then sets the first bit in the 32 bit signal. The First On ASIC then rings the next ASIC in the chain with the updated address allocation map. The second chip receives the chip address allocation map, assigns the appropriate address to its chip address register, and sets the next of the 32 bits before ringing the next ASIC in the system. Up to 32 ASICs may have addresses allocated in this way with very simple hardware, since only a counter is needed to determine the address from the 32 bit address map.

The ASICs are also linked to the network management system by a network management bus. In normal network operation, the management system contacts the ASICs to read or write data relating to the ports with which the ASICs are associated. The management system is also involved in the chip address allocation process by signaling the ASICs that there has been a change in the system which requires rerunning the chip address allocation ring.

It should be appreciated that the present invention can be implemented in numerous ways, including as a process, an apparatus, a system, a device, a method, or a computer readable medium. Several inventive embodiments of the present invention are described below.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
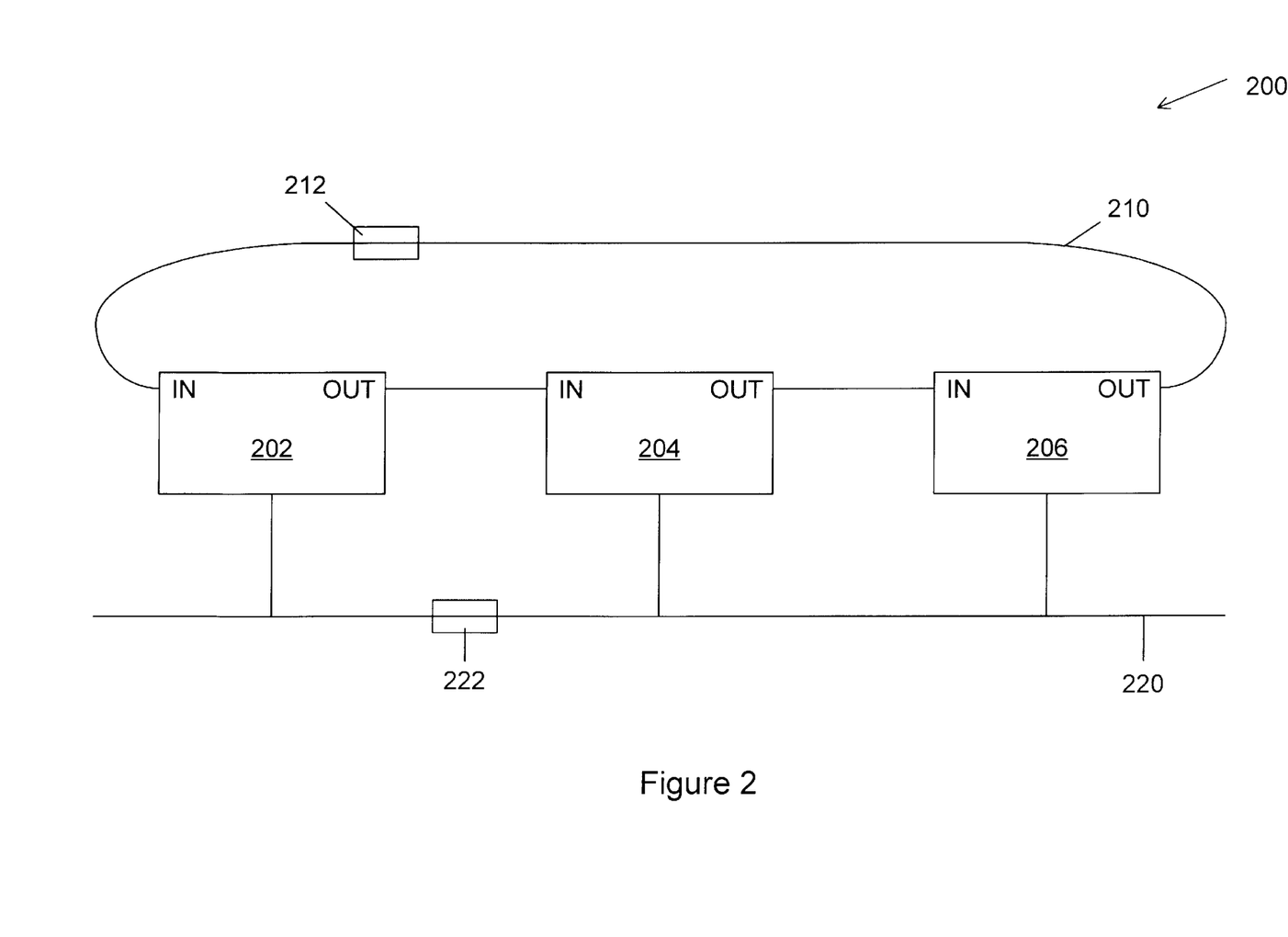
FIG. 2 depicts a block diagram of a chip address assignment network according to a preferred embodiment of the present invention.

FIG. 2 depicts a block diagram of a chip address assignment network according to a preferred embodiment of the present invention. The figure shows a representative portion of a computer network 200, such as a Fast Ethernet, showing three ASICs 202, 204 and 206. The ASICs are chained together through a serial data ring 210 which provides a communication link between all ASICs in the system. Where all the ASICs are included in a single repeater, the ring 210 may run on PCB traces connecting the ASICs on the repeater mother board. Where the ASICs are located in several stacked repeaters, the ring 210 may run on a combination of PCB traces and cables linking the repeaters in the stack. Information may be sent around the chain in a chip address allocation ring 212, described in more detail below.

The ASICs 202, 204 and 206 of the network 200 perform the essential repeater functions. Each ASIC is associated with specific ports on the repeater for which it controls and monitors status and activity and maintains statistics. The ASICs are therefore also linked to the network's management bus 220 which provides a communication link between the network's management module and the ASICs so that a network administrator may access the ASICs to read or write data relating to the ports with which the ASICs are associated.

In order to perform management functions for a particular port, the management module needs to be able to specifically access the ASIC associated with that port. To do so, it must be able to identify a register relating to the particular management function of interest, and the address of the chip associated with the port of interest. Once it has done this, it must indicate to the chip if it needs it to read or write data, and then, it must provide the data to be read or space for the data to be written, respectively. In a preferred embodiment, the network management module may transmit a 32 bit frame 222 to accomplish these tasks. The first 8 bits identify the chip address in bits 0 through 6. The final bit of the first 8 is devoted to indicating whether the management operation involves reading or writing. The next 8 bits identify the address of the register of interest, and the remaining 16 bits are data for the chip to read or blank for the chip to write to depending on the state of the read/write bit.

It may be understood from the foregoing that in order for management functions to be conducted properly and therefore, for the network to operate effectively, it is essential that the chip addresses be accurately allocated and maintained. The importance and challenge of this task is further heightened when it is realized that ports and chips may be continuously being added to an expanding network, and ports and chips may periodically fail, both of which may require reallocation of chip address. Moreover, where stacked repeaters are used in a network, it is advantageous if various units may be removed from or added to the stack without powering down the network ("hot insertion"). The chip address assignment network of the present invention is designed to meet these requirements.

Figure 3:
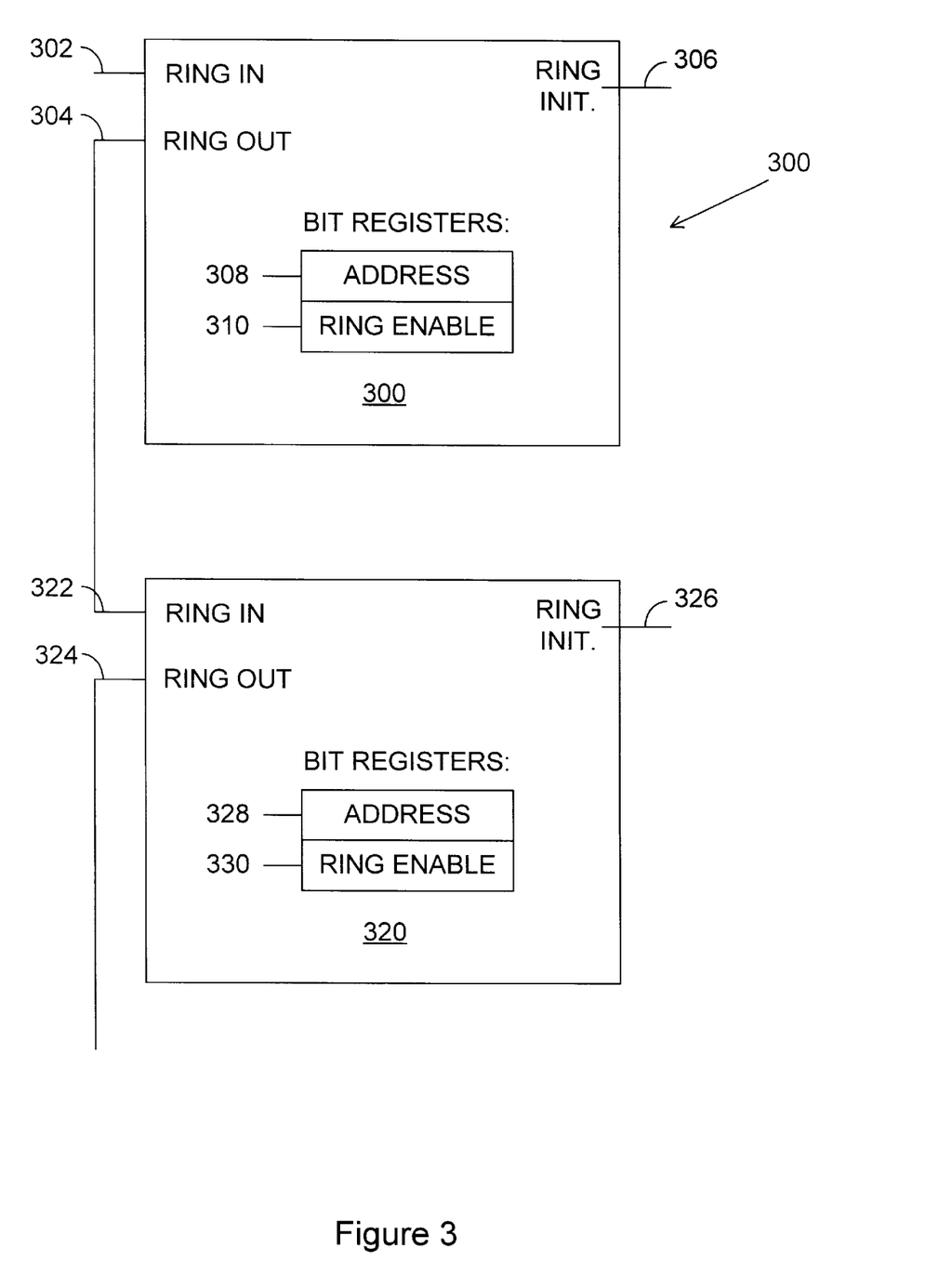
FIG. 3 depicts a block diagram of an ASIC in a chip address allocation system in accordance with a preferred embodiment of the present invention showing bit registers.

FIG. 3 depicts a more detailed block diagram of two chained ASICs in a chip address allocation system in accordance with a preferred embodiment of the present invention. Each chip 300 and 320 includes Ring In 302 and 322, Ring Out 304 and 324, and Ring Initiator 306 and 326 lines. The chips are chained together from the Ring Out line 304 of one chip 300 to the Ring In line 322 of the next chip 320. The chain starts with a chip which initiates the chip allocation address bit map, designated as "First On." In a non-stackable single repeater system, the First On chip may be hardwired so that upon power-up or any event during network operation that requires reallocation of chip address that chip initiates the address bit map. In a stackable repeater system, each of the repeaters should be wired the same way. Therefore a driver may be used to designate the First On ASIC based on what is most appropriate for the system architecture. For example, in a synchronous stackable system, the First On ASIC will preferably be on the clock master repeater board.

Figure 4:
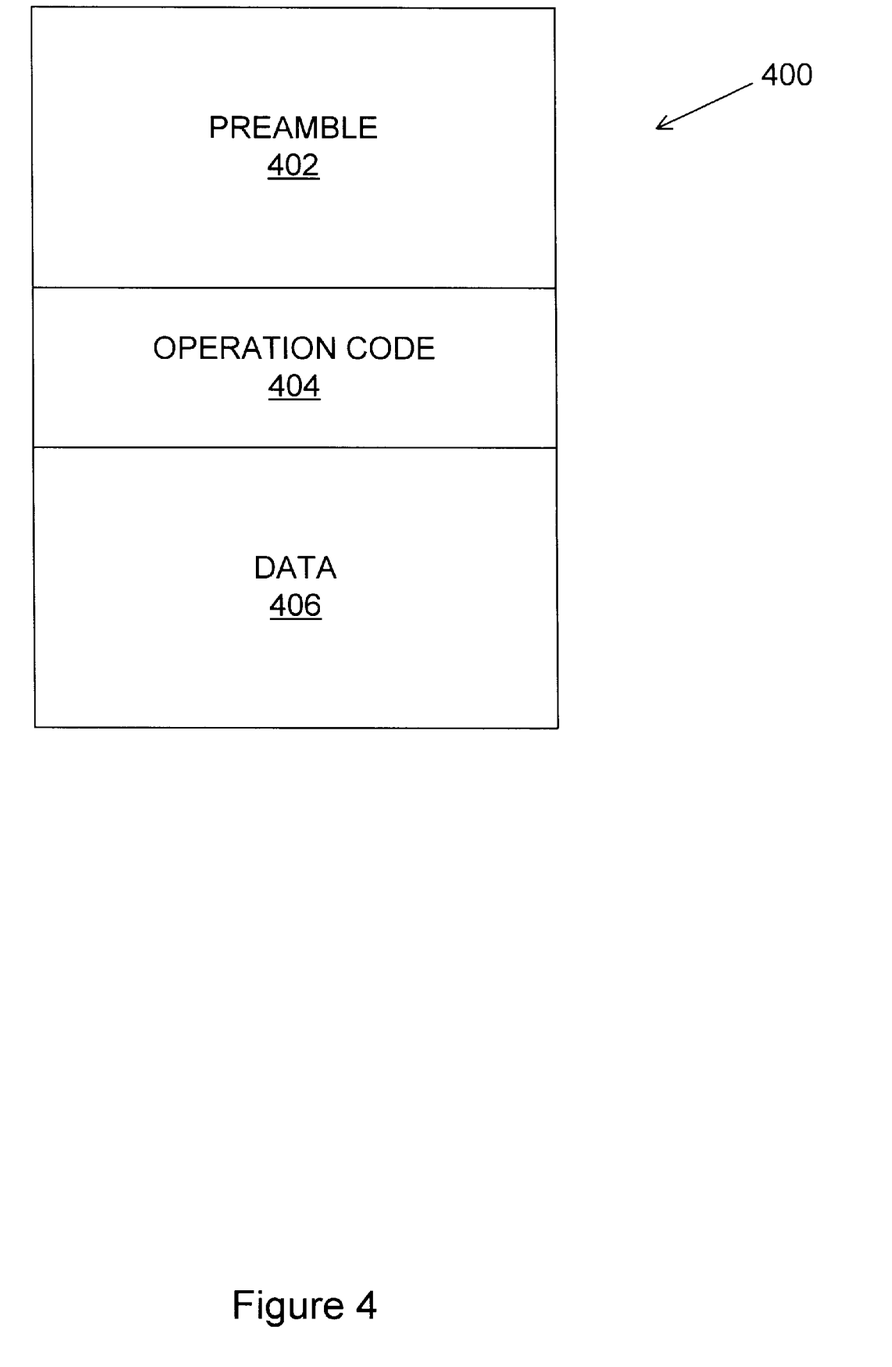
FIG. 4 depicts a data structure useful to transmit data between ASICs in a chip address allocation system in accordance with a preferred embodiment of the present invention.

In a preferred embodiment, the First On ASIC initiates a chip address allocation ring with a 3-component structure. Referring to FIG. 4, the ring structure 400 includes a 32 bit preamble 402, a 4 bit operation code 404, and a 32 bit data segment 406. The purpose of the preamble 402 is to qualify the validity of the ring by distinguishing it from noise. This is done by providing a non-random sequence of bits, for example alternating 1s and 0s for 30 bits and ending with 11. When a chip receives this preamble on its Ring In line it knows that real data will follow. The preamble is followed by the operation code 404 serves to identify the type of information on the ring. Since it is 4 bits, the operation code can designate up to 16 different types of ring information. Following the operation code is a 32 bit segment of data 406 of the type identified by the operation code 404. Where the operation code 404 has identified the data as chip address allocation data, the 32 bits which follow are a chip address map for allocating chip addresses.

The First On chip will preferably initiate and propagate a chip address allocation ring at regular intervals. However, if, for example, there have been no changes to the network since the last address allocation ring was passed, there may be no need to go through the address allocation process. Therefore, in a preferred embodiment, the management module can control the execution of a chip address allocation round through a bit on each chip, the Ring Enable bit. If a chip's Ring Enable bit is high, then the chip address allocation ring will be recognized and processed by a chip. However, if the chip's Ring Enable bit is low, the chip will ignore data which an operation code identifies as being related to chip address allocation and simply pass it through to the next chip in the chain.

In a preferred embodiment, the 32 bit chip address map segment of the ring is initially set to all 0s. The First On ASIC, which has initiated the ring, checks its Ring Enable bit. If the bit is high, the chip stores its address as chip 0 in its address register, sets the first bit of the address map to 1 and rings the next chip in the chain with the updated address bit map. Alternatively, since the First On chip determines its address as chip 0 from the fact that it received a high Ring Initiator signal and ignores any signal on its Ring In line, the address map may also initially have its first bit set to 1 and simply pass it on to the next chip in the chain without modifying it. As long as its Ring Enable bit is high, each successive chip in the chain assigns to its chip address register the address it receives from the previous chip in the chain, sets the next bit in the address map, and passes the map on. In this way, up to 32 ASICs may have addresses automatically allocated with very simple hardware, since only a counter is needed to determine the address from the 32 bit address map where the address is simply the number of bits set to 1.

For example, as shown in FIG. 3, if chip 300 is to be the First On chip, then its Ring Initiator line 306 will receive a logic high signal. If the chip 300 detects a logic high Ring Initiator signal it knows it is the First On ASIC and it ignores any data received on its Ring In line 302. The First On chip then initiates the ring, including the chip address map. If the First On chip's Ring Enable bit 310 is high, it allocates the initial address (0) to itself, and saves the address in the chip's address register 308. The chip 300 then updates the address map by setting the first bit to 1, and rings the next chip in the chain with the updated address allocation map through its Ring Out line 320.

The second chip 320 receives the ring through its Ring In line 322. It looks at the preamble to know that the following data is real, and then looks at the operation code to learn that the next 32 bits of data provide an address map with a chip address. If the chip's Ring Enable bit 330 is high, it counts the set bits to determine its chip address. The chip 320 then stores the address to its chip address register 328, and updates the address map with the address for the next chip in the chain by setting the next bit to 1, before ringing the next ASIC in the system (not shown) through its Ring Out line 324. When the last chip in the chain is reached, its Ring Out signal is sent back to the first chip in the chain so that it will contain the final address map for the whole system. As described above, since the First On chip's Ring Initiator bit is high, it will ignore the address allocation data returned to it by the last chip and will not reset its address. Also as noted above, if either chip's Ring Enable bit is low, it does not process the address allocation data and just passes it on to the next chip.

Figure 5:
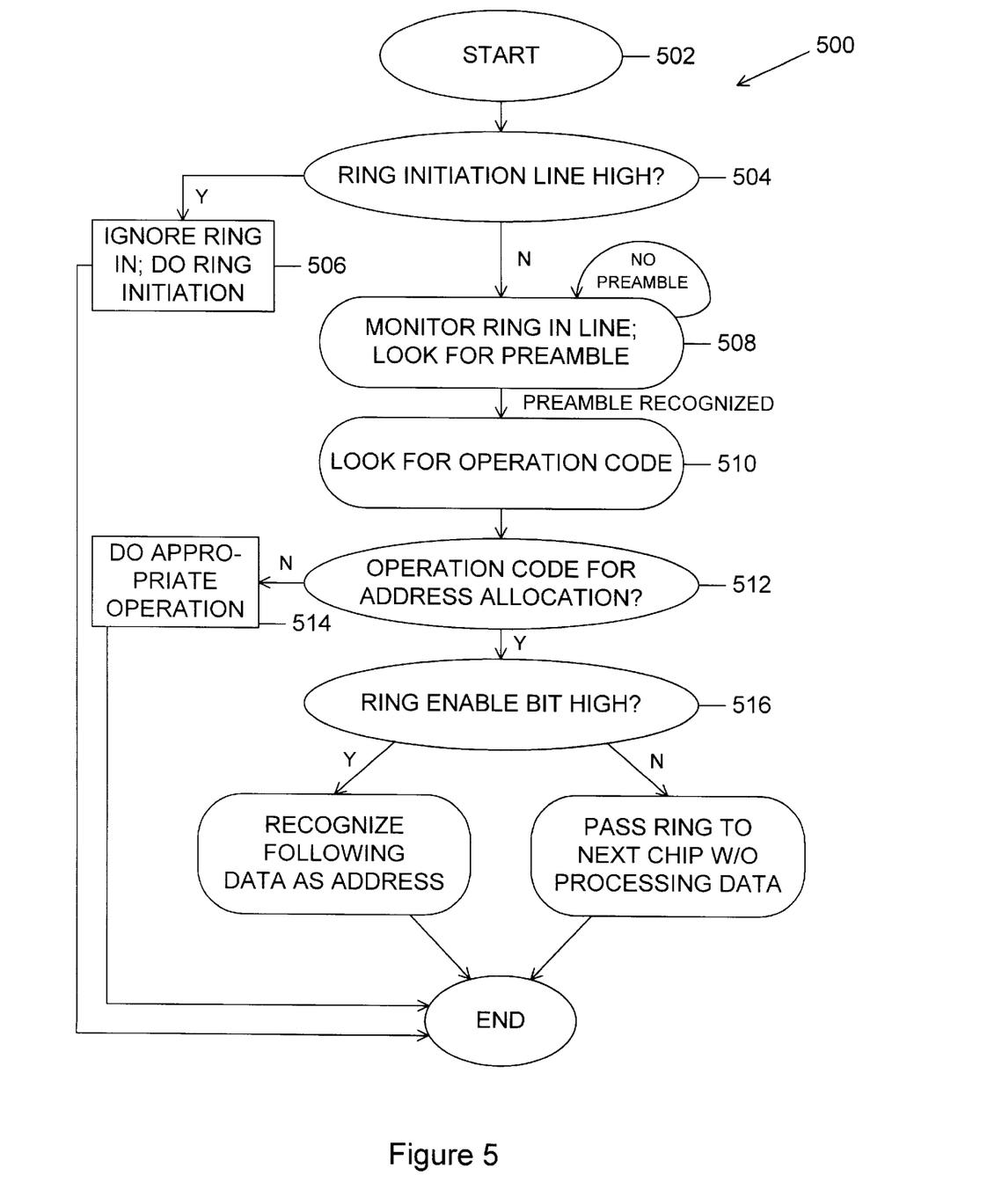
FIG. 5 depicts a flow chart of a process for handling data received on an ASIC's Ring In line according to a preferred embodiment of the present invention.

FIG. 5 depicts a flow chart showing steps in a process of handling data received on a chip's Ring In line in accordance with a preferred embodiment of the present invention. The process 500 begins at 502 and at a decision step 504 the chip checks to see if its Ring Initiation line is high. If so, as discussed above, the chip knows that it is the First On and at a step 506 it ignores any data received on its Ring In and initiates the ring. If the Ring Initiation line is low, then the decision step 504 is answered in the negative, and, at a step 506, the chip monitors its Ring In line looking for a preamble. As described above, in one embodiment the preamble may be 32 bits long with a series of alternating 1s and 0s for 30 bits ending with 11. As long as no preamble is recognized, the chip continues to monitor the Ring In line.

When a preamble is recognized, the chip knows that real data will follow on the ring, and, at a step 510, the chip then looks for an operation code following the preamble to tell it the operation to which the data relates. If the operation code relates to an operation other than chip address allocation, then decision step 512 is answered in the negative and, at a step 514, the chip responds appropriately to the data for that operation. If, however, the operation code relates to chip address allocation, then decision step 512 is answered in the affirmative and, at a step 516, the chip checks to see if its Ring Enable bit is high. If decision step 516 is answered in the negative, the ring is passed to the next chip without being processed at a step 518. If decision step 516 is answered in the affirmative, the chip recognizes the following data, for example the next 32 bits, as it address at a step 520. The process ends at 522.

Figure 6:
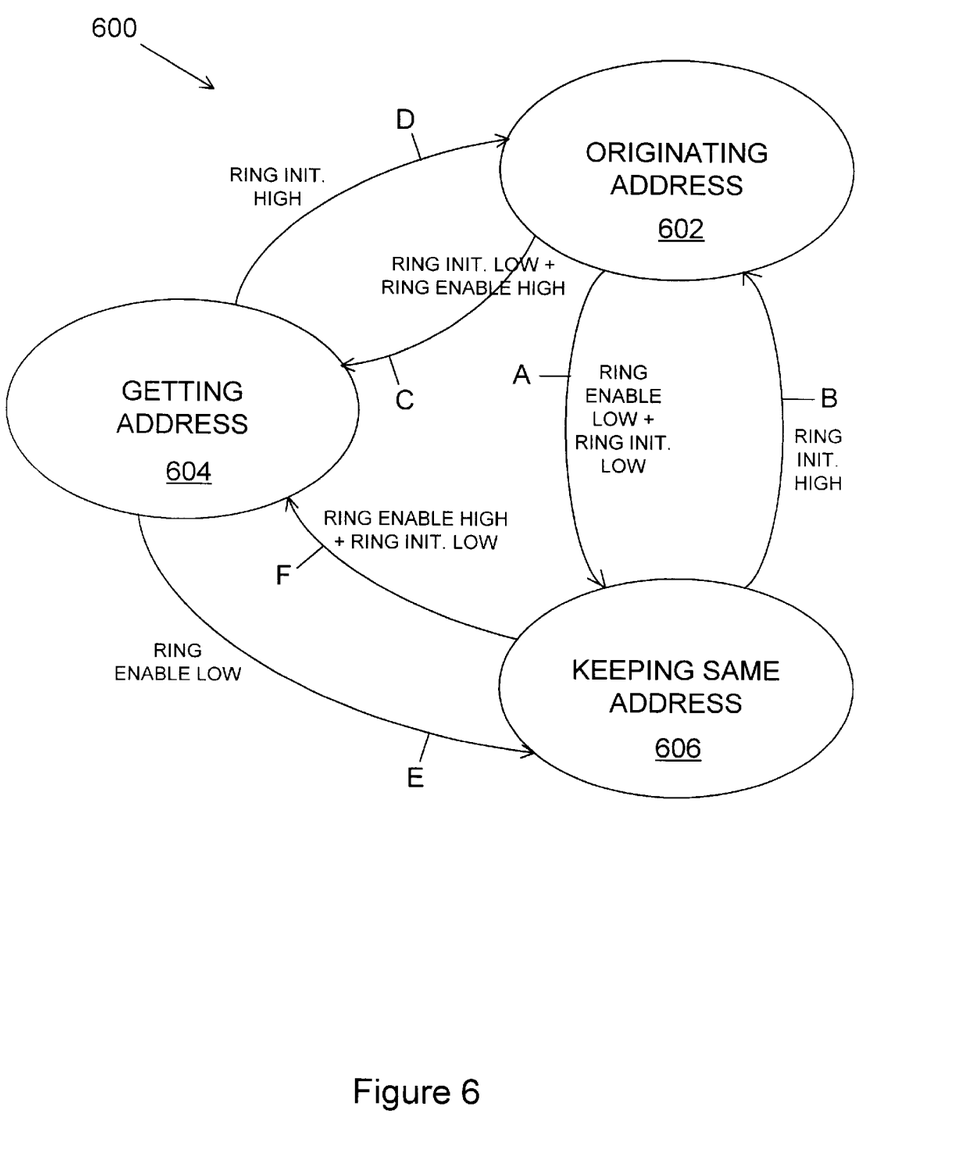
FIG. 6 depicts a state diagram of an automatic chip address allocation system according to a preferred embodiment of the present invention.

A chip subject to the chip address allocation system of the present invention may exist in a number of different states. FIG. 6 depicts a state diagram of an automatic chip address allocation system according to a preferred embodiment of the present invention. The state diagram 600, shows three states: Originating Address 602, Getting Address 604, and Keeping Same Address 606. The manifestation of the Originating Address state 602 is that the chip is the First On chip which initiates the chip address allocation ring. A chip in the Originating Address state 602 may transition to the Keeping Same Address state 606 if both its Ring Enable and its Ring Initiator bits are low, as indicated by arrow A. The manifestation of this state 606 is that address allocation data is not processed, so there is no change in the chip address.

A chip in the Originating Address state 602 may transition to the Getting Address state 604 if its Ring Initiator bit is low and its Ring Enable bit is high, as indicated by arrow C. This might occur, for example, in a stacked repeater when a new master management or clock module is selected on a different repeater due to a hardware failure or implementation of a new software version, resulting in another chip becoming the First On chip. The manifestation of the Getting Address state 602 is that the chip monitors the serial ring for the chip address allocation ring. Under the same circumstances, a chip in the Getting Address state 604 may transition to the Originating Address state 602 if its Ring Initiator bit is high, as indicated by arrow D.

The circumstances for and manifestations of the remaining state transitions may be understood from the foregoing description. A chip in the Getting Address state 604 may transition to the Keeping Same Address state 606 if its Ring Enable bit is low, as indicated by arrow E. A chip in the Keeping Same Address state 606 may transition to the Getting Address state 604 if its Ring Initiator bit is low and its Ring Enable bit is high, as indicated by arrow F. Finally, a chip in the Keeping Same Address state 606 may transition to the Originating Address state 602 if its Ring Initiator bit is high, as indicated by arrow B.

Figure 7:
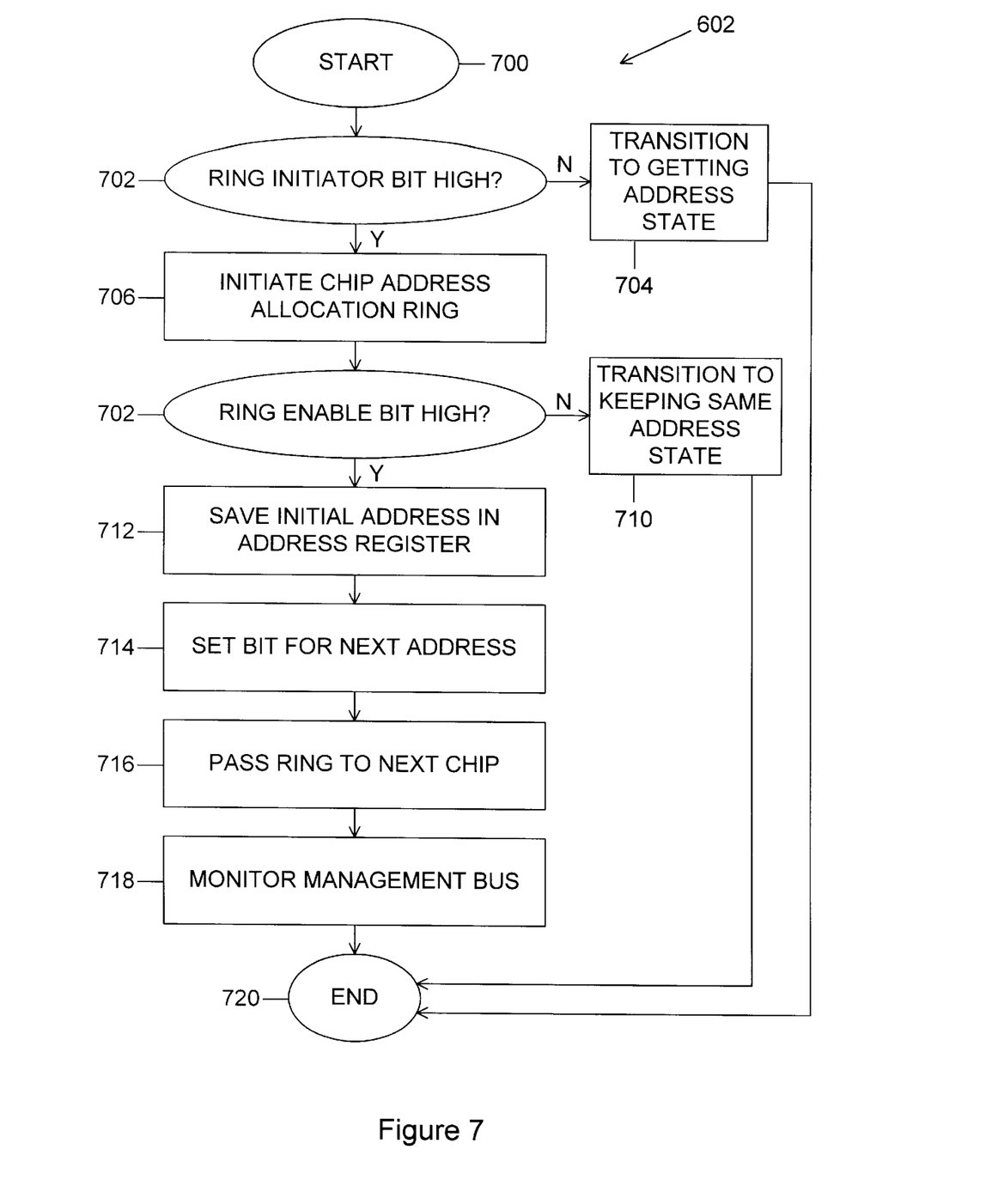
FIG. 7 depicts a flow chart of a process of a chip operating in the Originating Address state of FIG. 6.
Figure 8:
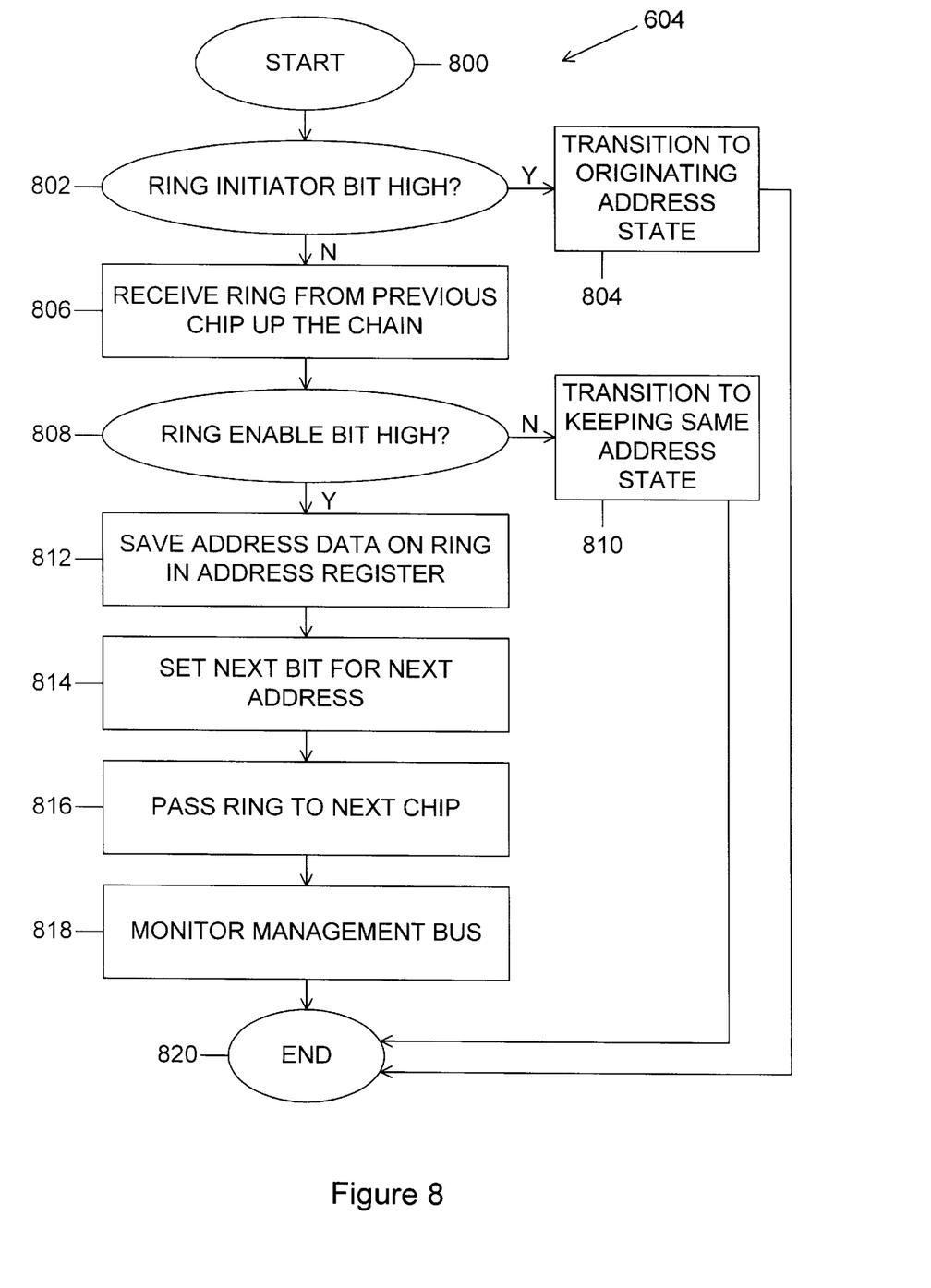
FIG. 8 depicts a flow chart of a process of a chip operating in the Getting Address state of FIG. 6.
Figure 9:
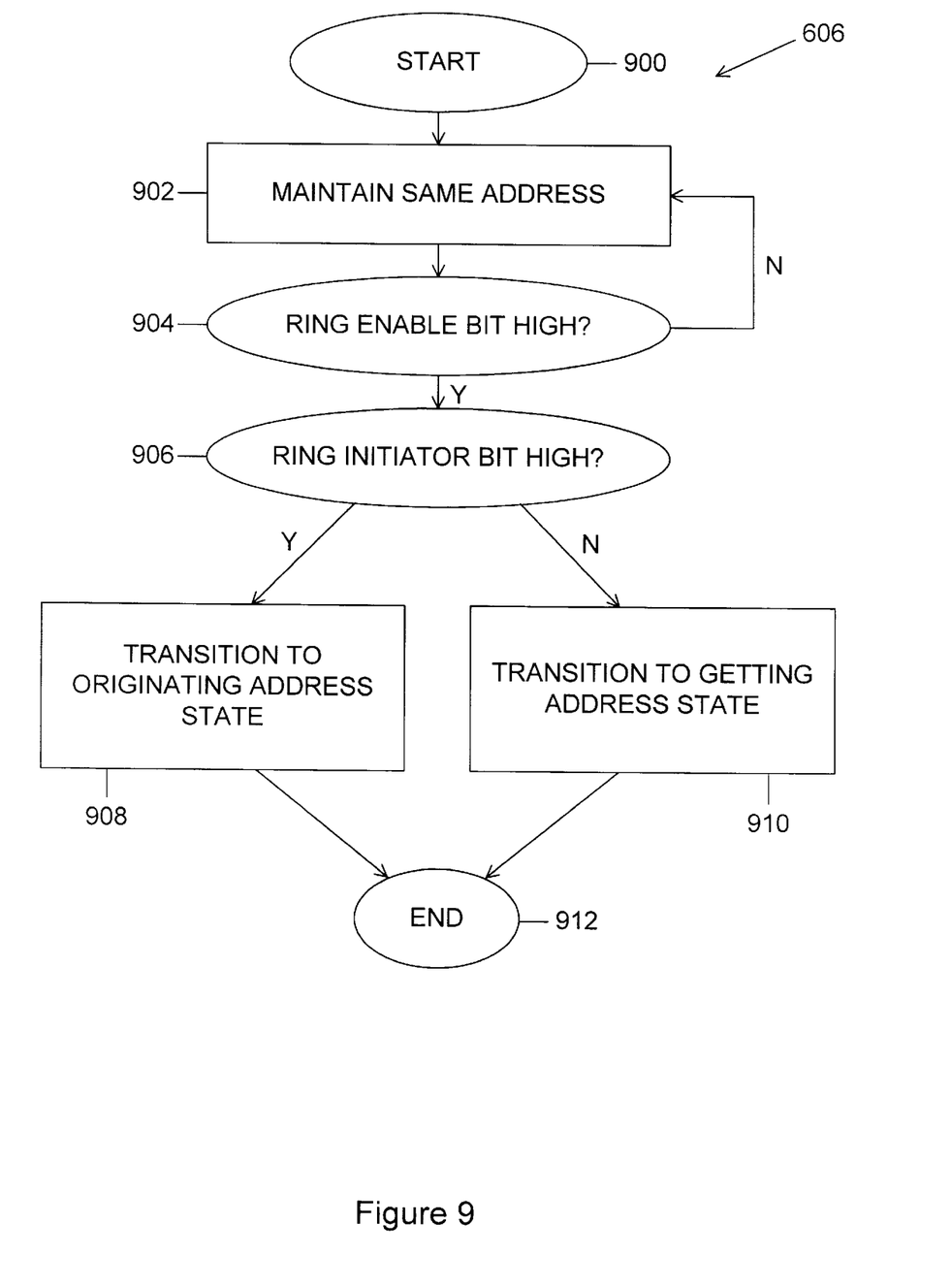
FIG. 9 depicts a flow chart of a process of a chip operating in the Keeping Same Address state of FIG. 6.

FIGS. 7 through 9 depict flow charts of processes for chips operating in each of the states described with reference to FIG. 6, according to a preferred embodiment of the present invention. Each of these processes provides an example of how a chip may operate in each state. Of course, the present invention is not limited to these particular processes, but may also be implemented in other ways, some of which are noted elsewhere herein.

In FIG. 7, the process represented by the Originating Address state 602 starts at 700 and at a step 702 a chip checks to see if its Ring Initiator bit is high. If decision step 702 is answered in the negative, the chip transitions to the Getting Address state at a step 704. If decision step 702 is answered in the affirmative, the chip is the First On chip and initiates the chip address allocation ring at a step 706. If the chip's Ring Enable bit is low, then decision step 708 is answered in the negative and the chip transitions to the Keeping Same Address state at a step 710. If the chip's Ring Enable bit is high, then decision step 708 is answered in the affirmative and the chip saves the initial address in its address register at a step 712. Then at a step 714, the chip sets the first bit in the 32 bit address data segment of the ring for the next address and, at a step 716, passes the ring to the next chip in the chain. At a step 718, the chip monitors the management bus for frames addressed to it. The management module is preferably operated so that all chips in the system are properly addressed before management activity begins on the network. The process end at 720.

In general, in a preferred embodiment the chip only begins to monitor the management bus once it has had its address allocated. One exception to this is the case of a broadcast write, such as when the manager sets the Ring Enable bit for all chips in the network. Since a broadcast write is writing to all chips, specific chip addresses are not needed. In one embodiment, a broadcast write is indicated by setting the first 8 bits of a management frame, which are normally dedicated to a chip address, to 1.

In FIG. 8, the process represented by the Getting Address state 604 starts at 800 and at a step 802 a chip checks to see if its Ring Initiator bit is high. If decision step 802 is answered in the affirmative, the chip transitions to the Originating Address state at a step 804. If decision step 802 is answered in the negative, the chip is not the First On chip and waits until it has received the chip address allocation ring from the next chip up the chain at a step 806. If the chip's Ring Enable bit is low, then decision step 808 is answered in the negative and the chip transitions to the Keeping Same Address state at a step 810. If the chip's Ring Enable bit is high, then decision step 808 is answered in the affirmative and the chip saves the address data on the ring in its address register at a step 812. Then at a step 814, the chip sets the next bit in the 32 bit address data segment of the ring for the next address and, at a step 816, passes the ring to the next chip in the chain. At a step 818, the chip monitors the management bus for frames addressed to it. As noted above, in a preferred embodiment, the chip only begins to monitor the management bus once its address has been allocated, and the management module operates so that all chips in the system are properly addressed before management activity begins on the network. The process end at 820.

In FIG. 9, the process represented by the Keeping Same Address state 606 starts at 900 and at a step 902 a chip maintains its current address. At a step 904, the chip checks to see if its Ring Initiator bit is high. If decision step 904 is answered in the negative, the chip continues to maintain its current address. If decision step 904 is answered in the affirmative, the chip checks to see if its Ring Initiator bit is high at a step 906. If decision step 906 is answered in the affirmative, the chip transitions to Originating Address state at a step 908. If decision step 906 is answered in the negative, the chip transitions to Getting Address state at a step 910. The process end at 912.

As discussed previously, the First On chip continues to periodically initiate and propagate a chip address allocation ring, whether or not the ring is enabled (i.e., chips in the chain have their Ring Enable bits high). If the ring becomes enabled when it is in the middle of the chain, and the ring address allocation system begins to operate at a chip other than the First On chip, then the chips may be incorrectly addressed. The management module takes this possibility into account by delaying any management activity until a full circuit of a ring initiated by the First On chip has occurred. This feature of the present invention is particularly useful the event of a stack interrupt event, such as the insertion of another repeater unit into a repeater stack ("hot insertion"), which necessitates a reallocation of chip addresses.

While the present invention has been described mainly in terms of a 100BaseT Fast Ethernet environment, it should also be noted that advances continue to be made in networking technology which make even faster data transmission possible. The present invention may also be applicable to these emerging technologies, such as Gigabit per second data transmission rates.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for automatically allocating chip addresses to chips on a network repeater, comprising:

a plurality of chips in a repeater;

a serial data ring linking all the chips in the repeater in a chain;

a network management bus linked to each chip in the chain; and a protocol for allocation of addresses to chips in the chain, said protocol comprising:

initiating a chip address allocation ring at a first chip in the chain;

saving an initial chip address in the first chip's register address:

setting a bit in the address data to provide the address for a next chip in the chain;

sending the chip address allocation ring with the set chip address data to the next chip;

saving the chip address in said next chip's register address;

setting a subsequent bit in the address data to provide the address for a subsequent chip; and sending the chip address allocation ring with the reset chip address data to the subsequent chip.

2. The system of claim 1, further comprising monitoring the network management bus following a step of sending the chip address allocation ring.

3. The system of claim 1 further comprising repeating the three final steps for each chip in the chain.

4. The system of claim 3, further comprising monitoring the network management bus following the step of sending the chip address allocation ring.

5. The system of claim 1, wherein said ring has a three-part data structure.

6. The system of claim 5, wherein said structure comprises a preamble portion, an operation code portion, and a data portion.

7. The system of claim 5, wherein said preamble qualifies the validity of the chip address allocation ring by distinguishing said ring from noise.

8. The system of claim 5, wherein said operation code identifies the type of information on the chip address allocation ring.

9. The system of claim 5, wherein said data provides a chip address map for allocating chip addresses.

10. The system of claim 5, wherein said preamble portion comprises 32 bits, said operation code portion comprises 4 bits, and said data portion comprises 32 bits.

11. The system of claim 10, wherein each of 32 chip addresses are represented in said data portion by consecutive bits set to 1.

* * * * *